US011226224B2

United States Patent
Fyfe (10) Patent No.: US 11,226,224 B2
(45) Date of Patent: Jan. 18, 2022

(54) DUAL DISPENSING PACK

(71) Applicant: L'Oreal, Paris (FR)

(72) Inventor: Jason Fyfe, Homdel, NJ (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 16/728,310

(22) Filed: Dec. 27, 2019

(65) Prior Publication Data

US 2021/0199483 A1     Jul. 1, 2021

(51) Int. Cl.
    *G01F 11/02*      (2006.01)
    *B05B 11/00*      (2006.01)
    *B65D 81/32*      (2006.01)

(52) U.S. Cl.
    CPC ........ *G01F 11/023* (2013.01); *B05B 11/3007* (2013.01); *B05B 11/3084* (2013.01); *B65D 81/3227* (2013.01); *G01F 11/028* (2013.01)

(58) Field of Classification Search
    CPC .. G01F 11/028; G01F 11/023; B05B 11/3005; B05B 11/3007; B05B 11/3008; B05B 11/3081; B05B 11/3083; B05B 11/3084; B05B 11/0078; B05B 11/30; B05B 11/3001; B05B 11/3043; B05B 11/3045; B05B 11/3046; B05B 11/3047; B05B 11/3052; B05B 15/30; B65D 81/3227
See application file for complete search history.

(56) References Cited

U.S. PATENT DOCUMENTS

| | | | | |
|---|---|---|---|---|
| 2,123,737 A | * | 7/1938 | Lewis | G01F 11/025 222/309 |
| 3,556,353 A | * | 1/1971 | Echols | G01F 11/06 222/309 |
| 4,913,319 A | * | 4/1990 | Root | A47K 5/03 222/135 |
| 5,016,780 A | * | 5/1991 | Moretti | B05B 11/3001 222/153.13 |
| 5,169,029 A | * | 12/1992 | Behar | B05B 11/3084 128/200.23 |
| 5,240,146 A | * | 8/1993 | Smedley | A61M 5/19 222/137 |

(Continued)

FOREIGN PATENT DOCUMENTS

| | | |
|---|---|---|
| CA | 2029332 A1 | 5/1991 |
| EP | 0427609 A1 | 5/1991 |

OTHER PUBLICATIONS

International Search Report and Written Opinion dated Mar. 26, 2021, issued in corresponding International Application No. PCT/US2020/066446, filed Dec. 21, 2020, 16 pages.

*Primary Examiner* — Patrick M. Buechner
(74) *Attorney, Agent, or Firm* — Christensen O'Connor Johnson Kindness PLLC (57) ABSTRACT

A dual dispensing pack includes a dual dispensing pump head having a first pumping assembly and a second pumping assembly. The first pumping assembly is operatively coupleable to a first bottle and the second pumping assembly is operatively coupleable to a second bottle. The first pumping assembly includes a first piston, and the second pumping assembly includes a second piston. A stroke length of the first piston is the same as a stroke length of the second piston, and a volume dispensed by the first pump assembly is independently varied from a volume dispensed from the second pump assembly.

19 Claims, 4 Drawing Sheets

(56) References Cited

U.S. PATENT DOCUMENTS

| | | |
|---|---|---|
| 5,318,203 A | 6/1994 | Iaia et al. |
| 5,823,391 A | 10/1998 | Klauke |
| 5,862,949 A | 1/1999 | Markey et al. |
| 5,901,883 A | 5/1999 | Ritsche |
| 6,083,528 A * | 7/2000 | Elliesen ............ A61K 31/57 221/206 |
| 6,161,729 A | 12/2000 | Gentile et al. |
| 6,443,331 B1 * | 9/2002 | DeJonge ............ B05B 11/00 222/153.13 |
| 7,195,135 B1 * | 3/2007 | Garcia ............ B05B 11/3084 222/137 |
| 8,261,949 B2 | 9/2012 | Oden et al. |
| 9,410,837 B2 * | 8/2016 | Brugger ............ B05B 11/3015 |
| 10,913,077 B1 * | 2/2021 | Chen ............ B05B 11/0038 |
| 2003/0089738 A1 * | 5/2003 | Peterson ............ B05B 11/3084 222/135 |
| 2005/0184090 A1 | 8/2005 | DeJonge |
| 2006/0037974 A1 * | 2/2006 | Brugger ............ B05B 11/3084 222/383.1 |
| 2010/0044394 A1 * | 2/2010 | Milian ............ B05B 11/3008 222/135 |
| 2012/0298694 A1 * | 11/2012 | Holzmann ............ B05B 11/3095 222/135 |
| 2013/0299514 A1 * | 11/2013 | Holzmann ............ G01F 11/023 222/134 |
| 2014/0076935 A1 | 3/2014 | Kim |
| 2016/0073762 A1 * | 3/2016 | Lee ............ B01F 15/0227 222/145.6 |
| 2016/0199863 A1 * | 7/2016 | Lee ............ A45D 34/00 222/135 |
| 2017/0144179 A1 * | 5/2017 | Bruder ............ A45D 40/24 |
| 2019/0357656 A1 * | 11/2019 | Kang ............ A45D 19/022 |
| 2020/0054114 A1 * | 2/2020 | Kang ............ B05B 11/3001 |

* cited by examiner

DUAL DISPENSING PACK

SUMMARY

In one embodiment, a dual dispensing pack comprises a dual dispensing pump head having a first pumping assembly and a second pumping assembly; the first pumping assembly operatively coupleable to a first bottle and the second pumping assembly operatively coupleable to a second bottle; and the first pumping assembly including a first piston, and the second pumping assembly including a second piston; wherein a stroke length of the first piston is the same as a stroke length of the second piston; and wherein a volume dispensed by the first pump assembly is independently varied from a volume dispensed from the second pump assembly.

In one embodiment, the dual dispensing pack comprises a tap rigidly connecting the first piston to the second piston.

In one embodiment, the first piston includes a first annular plug that slides on the first piston between a first static brake and a first adjustable brake on the first piston, and the second piston includes a second annular plug that slides on the second piston between a second static brake and a second adjustable brake on the second piston In one embodiment, the dual dispensing pack comprises a first dial connected to the first adjustable brake that moves the first adjustable brake up or down depending on rotating the first dial clockwise or counterclockwise, and a second dial connected to the second adjustable brake that moves the second adjustable brake up or down depending on rotating the second dial clockwise or counterclockwise.

In one embodiment, the first dial is fitted on the outside of the first piston and the second dial is fitted on the outside of the second piston.

In one embodiment, the first and the second bottles are detachable from the dual dispensing pump head.

In one embodiment, the first bottle includes a first diptube, and the second bottle includes a second diptube.

In one embodiment, dual dispensing pump head comprises: a first pumping assembly connected to a dual dispensing tap; a second pumping assembly connected to the dual dispensing tap; and wherein the first pumping assembly includes a first piston, and the second pumping assembly includes a second piston, wherein a stroke length of the first and second piston is the same, and the volume dispensed by the first and second pump assemblies is independently varied.

In one embodiment, the tap rigidly connects the first piston to the second piston.

In one embodiment, the first piston includes a first annular plug that slides on the first piston between a first static brake and a first adjustable brake on the first piston, and the second piston includes a second annular plug that slides on the second piston between a second static brake and a second adjustable brake on the second piston.

In one embodiment, the dual dispensing pack comprises a first dial connected to the first adjustable brake that moves the first adjustable brake up or down depending on rotating the first dial clockwise or counterclockwise, and a second dial connected to the second adjustable brake that moves the second adjustable brake up or down depending on rotating the second dial clockwise or counterclockwise.

In one embodiment, the first dial is fitted on the outside of the first piston and the second dial is fitted on the outside of the second piston In one embodiment, a pumping assembly comprises: a variable volume chamber; a piston that slides up and down within the variable volume chamber at the upper opening of the variable volume chamber, wherein the piston includes an annular plug that slides on the piston between a static brake and an adjustable brake on the piston, wherein the annular plug opens and closes a passage from the variable volume chamber to a hollow center of the piston.

In one embodiment, the pumping assembly further comprises a compression spring that applies an upward force on the piston, and a ball valve that opens and closes an opening at the lower end of the variable volume chamber.

In one embodiment, the pumping assembly further comprises a dial connected to the adjustable brake that moves the adjustable brake up or down depending on rotating the first dial clockwise or counterclockwise.

In one embodiment, a method of making a multiple fluid dispensing pump head comprises: assembling two or more of the pumping assemblies in a single multiple fluid dispensing pump head.

In one embodiment, the method further comprises rigidly connecting the piston of each pumping assembly to a common tap.

In one embodiment, a dual dispensing pack comprises: a dual dispensing pump head having a first pumping assembly and a second pumping assembly; the first pumping assembly operatively coupleable to a first bottle and the second pumping assembly operatively coupleable to a second bottle; the first pumping assembly including a first piston, and the second pumping assembly including a second piston; wherein a stroke length of the first piston is set different to a stroke length of the second piston; and wherein a volume dispensed by the first pump assembly is independently varied from a volume dispensed from the second pump assembly.

In one embodiment, the dual dispensing pack further comprises a separate tap for each piston, wherein the separate taps are juxtaposed next to each other for depressing with a common action.

In one embodiment, the separate taps are at the same height at initial piston setting.

In one embodiment, the separate taps are at different heights at initial piston setting.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
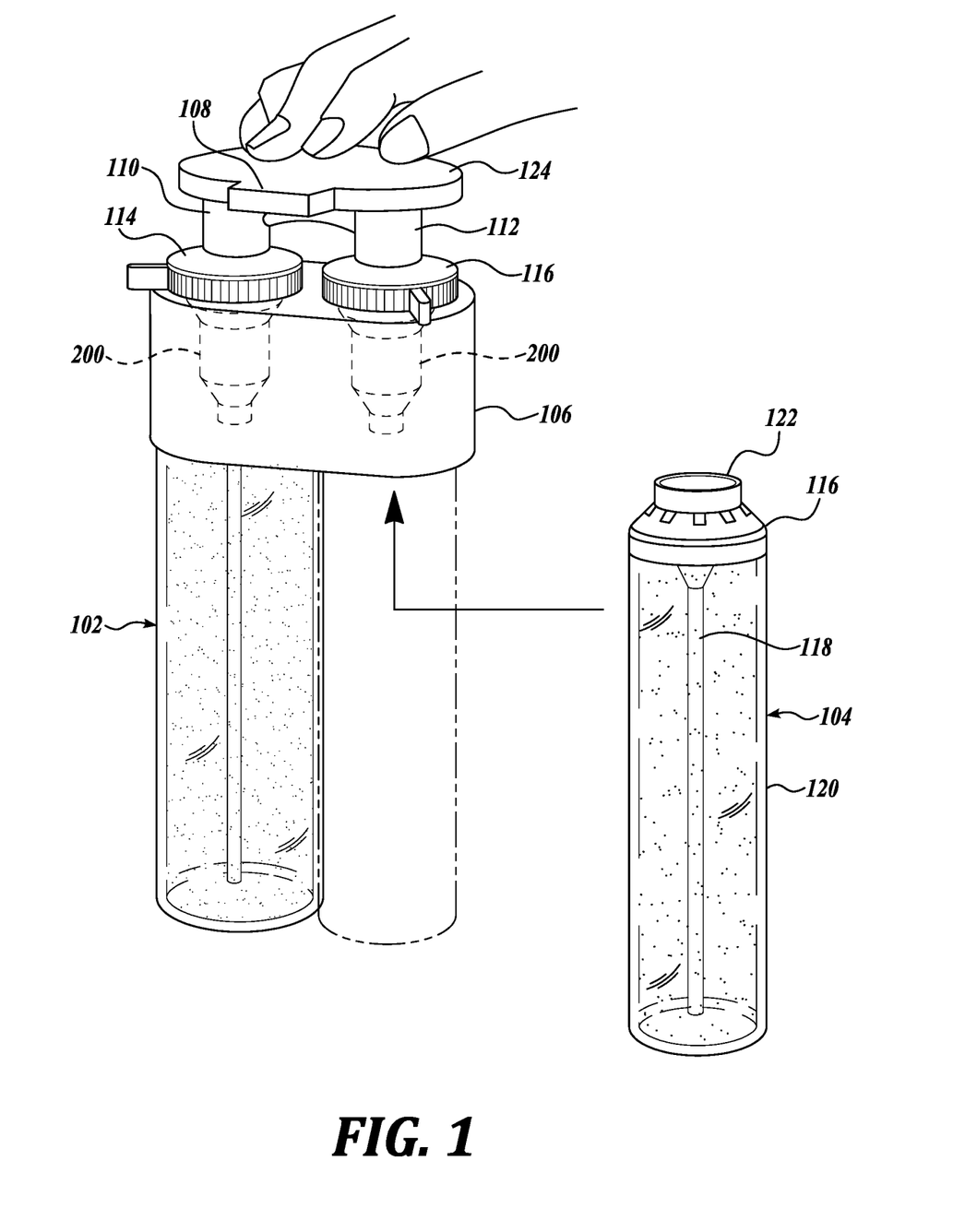
FIG. 1 is a diagrammatical illustration of a dual dispensing pack with independently adjustable volume dispensing.

Referring to FIG. 1, one embodiment of a dual dispensing pack 100 includes a first bottle 102, a second bottle 104, and a dual dispensing or mixing pump head 106 with ratio control. The first and second bottles 102, 104 are refillable and can be attached and detached from the dual dispensing pump head 106. In one embodiment, the simultaneous dispensing of two liquids in varying ratios is desirable, such as when dispensing two different products, each one having a different property or function, or where one product is enhanced by the combination with a second product. Examples of liquids which may be dispensed include, but are not limited to, hair care products, such as shampoos, conditioners, hair dyes, dandruff-control, skin care products, such as lotions, sanitizers, moisturizers, anti-bacterial creams, and the like. The dual dispensing pack 100 is not limited to dispensing hair or skin care products and may be put to other uses, such as in the dispensing of specific ratios of epoxies and hardeners, 2-part polyurethane paints or floor finishes, and the like.

In an embodiment, the bottles 102, 104 can have any geometric form including regular or irregular forms. In an embodiment, the bottles 102, 104 comprise a cross-section of substantially any geometric shape including circular, triangular, square, rectangular polygonal, regular or irregular shapes, or the like, as well as other symmetrical and asymmetrical shapes, or combinations thereof. In an embodiment, the bottles 102, 104 include a body structure that is substantially cylindrical. In an embodiment, the bottles 102, 104 include a body structure that is substantially rigid or semi-rigid. In an embodiment, the bottles 102, 104 include a body structure that is pliable or semi-pliable. The bottles 102, 104 can be constructed out of a variety of materials including, for example, elastomers, co-elastomers, polymers, co-polymers, and blends or combinations thereof, etc. Other suitable materials for fabrication of the bottles 102, 104 include thermoplastic polymers, thermoplastic elastomers, glass, metals, and the like.

In an embodiment, the bottles 102, 104 are made from one or more recyclable materials, compostable materials, sustainable materials, biodegradable materials, plant-based material, and the like. In an embodiment, the bottles 102, 104 comprise one or more of biodegradable polymers, biodegradable polyesters, biodegradable polyurethanes, biodegradable starches, biodegradable cellulosic materials, biodegradable aliphatic polyesters, and the like.

In an embodiment, the bottles 102, 104 are made from injection molded starch. In an embodiment, the bottles 102, 104 are made from bamboo or wood pulp or bagasse using thermoforming or injection molding processes. In an embodiment, the bottles 102, 104 include mycelium & agricultural waste (as binder). In an embodiment, the bottles 102, 104 are made bio-based thin films. In an embodiment, the bottles 102, 104 are made from compostable or biodegradable materials, such as poly(lactic acid), polyethylene terephthalate, polycaprolactone, poly(1,4-butylene succinate), polyhydroxyalkanoate, cellulose and its derivatives, and polybutylene adipate terephthalate. In an embodiment, the bottles 102, 104 are made from non-woven poly(vinyl alcohol), optionally, impregnated with active ingredients. In an embodiment, the bottles 102, 104 include methylated crystalline cellulose (MCC) as a formula delivery vehicle.

In an embodiment, other parts of the dual dispensing pack 100 can be made from the above-mentioned materials used for the bottles 102, 104.

A description will be provided with respect to bottle 104 with the understanding that the bottle 102 is similar. The bottle 104 includes a reservoir portion 120 connected to an adaptor cap 116. The adaptor cap 116 can be threaded on or otherwise secured to the reservoir portion 120. In one embodiment, the adaptor cap 116 is removable to allow the reservoir portion 120 to be re-filled. In turn, the adaptor cap 116 can be threaded on or otherwise secured to the dual dispensing pump head 106. Specifically, the adaptor cap 116 can be threaded or otherwise secured to a pumping assembly 200. The adaptor cap 11 includes an inlet opening 122 that provides the connection to the dual dispensing pump head 106 to allow the withdrawal of fluid from the reservoir portion 120 through the diptube 118 and out through the dual dispensing tap 108. The connection between the dual dispensing pump head 106 to the diptube 118 should be secure to avoid leakage that would result in inaccurate volume dispensing. The dual dispensing pump head 106 includes a first pumping assembly 200 for bottle 102 and a second similar pumping assembly 200 for bottle 104.

Figure 2:
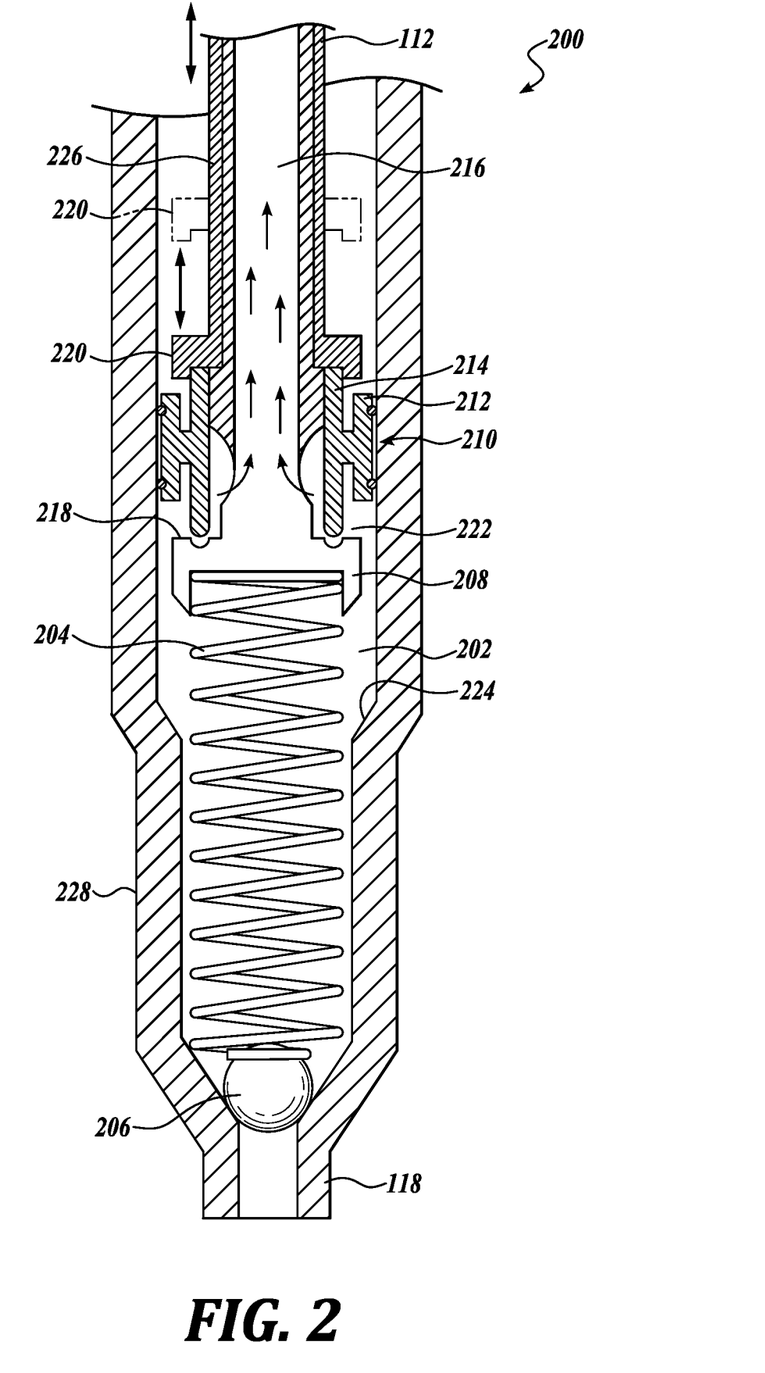
FIG. 2 is a diagrammatical illustration of a pumping assembly having adjustable volume dispensing used in the dual dispensing pack of FIG. 1.

Referring to FIG. 2, a pumping assembly 200 for piston 112 is illustrated. The piston 110 uses the similar pumping assembly 200. The pump assembly 200 includes the piston 112 that relies on manual-assist for downward motion and a spring-assist for upward motion. The piston 112 has hollow center 216 to allow the fluid from the bottle 104 to travel up through the piston 112 into the dual dispensing tap 108. In one embodiment, dual dispensing tap 108 can mix the two fluids prior to discharge. In one embodiment, the dual dispensing tap 108 can discharge the two fluids side by side. Depending on the fluids being discharged, the dual dispensing tap 108 configuration may allow mixing prior to discharge. In one embodiment, the dual dispensing tap 108 has a mixing valve to allow mixing in one valve orientation and prevent mixing in a second valve orientation.

The pump assembly 200 includes a variable volume chamber 202 whose volume changes as the piston 110, 112 is manually depressed and released. In one embodiment, the variable volume chamber 202 is a cylinder-shaped wall 228 of one or more diameters that is open at the top and bottom. The top of the variable volume chamber 202 is sealed by an annular plug 210 having the bottom end of the piston 112 pass through the center of the annular plug 210. The bottom end of the piston 112 has a spring seat 208 for supporting the top end of the compression spring 204. The bottom end of the compression spring 204 rests at the lower end of the chamber 202.

In one embodiment, the annular plug 210 has an outer ring 212 rigidly connected to an inner ring 214. The annular plug 214 seals the upper end of the chamber 202 at the space between the piston 112 and the wall 228, while allowing fluid to flow from the chamber 202 to the hollow center 216. The outer ring 212 is in a sliding, but, constantly sealing engagement to the inside wall 228 of the chamber 202, while the inner ring 214 slides on the exterior of the piston 112 creating a temporary passage, dependent on the direction of the piston 112, to permit fluid to enter the hollow center 216 from the chamber 202. The annular plug 210 therefore acts as a one-way valve that is open or closed depending on the direction of the piston 112.

The opening at the lower end of the chamber 202 leading to the diptube 118 has a one-way valve, such as ball valve 206, that closes when the piston 112 is manually assisted down and opens upon release of the downward pressure to allow the compression spring 204 to return the piston 112 to the up position. The one-way ball valve 206, for example, is captured between a narrower outlet at the bottom of the chamber 202 and bottom of the compression spring 204 that will keep the ball tightly closed on the downward stroke of the piston 112, but allow slight upward movement of the ball 206 to create a temporary opening to refill the chamber 202 with fluid when the piston 112 returns to the up position with spring-assist.

The upper end of the chamber 202 has the annular plug 210 which in addition to moving up and down with the action of the piston 112 also functions as a one-way valve. The annular plug 210 creates an opening passage 222 when the piston 112 is manually assisted down, which is the opposite action to the one-way ball valve 206, to allow fluid in the chamber 202 to pass into the hollow center 216 of the piston 112 through the passage 222 created between the bottom end of the inner ring 214 and the top of the spring seat 208.

Upon the spring-assisted return of the piston 112 to the up position, the annular plug 210 closes the passage 222 between the chamber 202 and hollow center 216 of the piston 116. The annular plug 210 generally moves up and down with the action of the piston 112. However, the annular plug 210 also has some play to slide up and down on the piston. The annular plug 210 also have to overcome friction of the seal between the outer ring 212 and the inner wall of the chamber 202. Therefore, the piston 112 has to push the annular plug 210 down, and drag the annular plug up. The piston 112 has an upper adjustable brake 220, such as a annular ring surrounding the exterior of the piston 112, that stops the upward sliding of the annular plug 210 on the piston 112, as the piston 112 is manually-assisted down. Specifically, in one embodiment, the top of the inner ring 214 catches on a groove in the brake 220. The piston has a lower static brake 218, such as the top of the spring seat 208, that stops the downward sliding of the annular plug 210 on the piston 112 as the piston 112 is spring-assisted up. Specifically, in one embodiment, the bottom of the inner ring 214 catches on a groove in the brake 218. Therefore, as the piston 112 is manually-assisted down, the annular ring 210 slides up on the piston 112 to the upper adjustable brake 220 opening the passage 222 between the chamber 202 and the hollow center 216 to force fluid up through the piston 112 and out through the dual dispensing tap 108. The piston 112 can continue to be depressed manually downward until the bottom of the spring seat 208 hits on the ledge 224 and stops the piston 116, reliably giving the same stroke length each time, which can further increase the accuracy of the volume dispensed. When the piston 112 is spring-assisted up, the annular plug 210 slides down the piston 112 to the lower static brake 218 closing the passage 222, and the ball valve 206 will open permitting the chamber 202 to be re-filled with fluid.

Referring to FIG. 1, the dual dispensing pump head 106 has a first dial 114 for the piston 110, and a second dial 116 for the piston 112. The dials 114 and 116 set the volume of fluid dispensed from each bottle 102 and 104. In one embodiment, the dual dispensing pump head 106 uses a common tap 108 to displace the first and second pistons 110, 112 equally, i.e., the same length of piston stroke.

Figure 4:
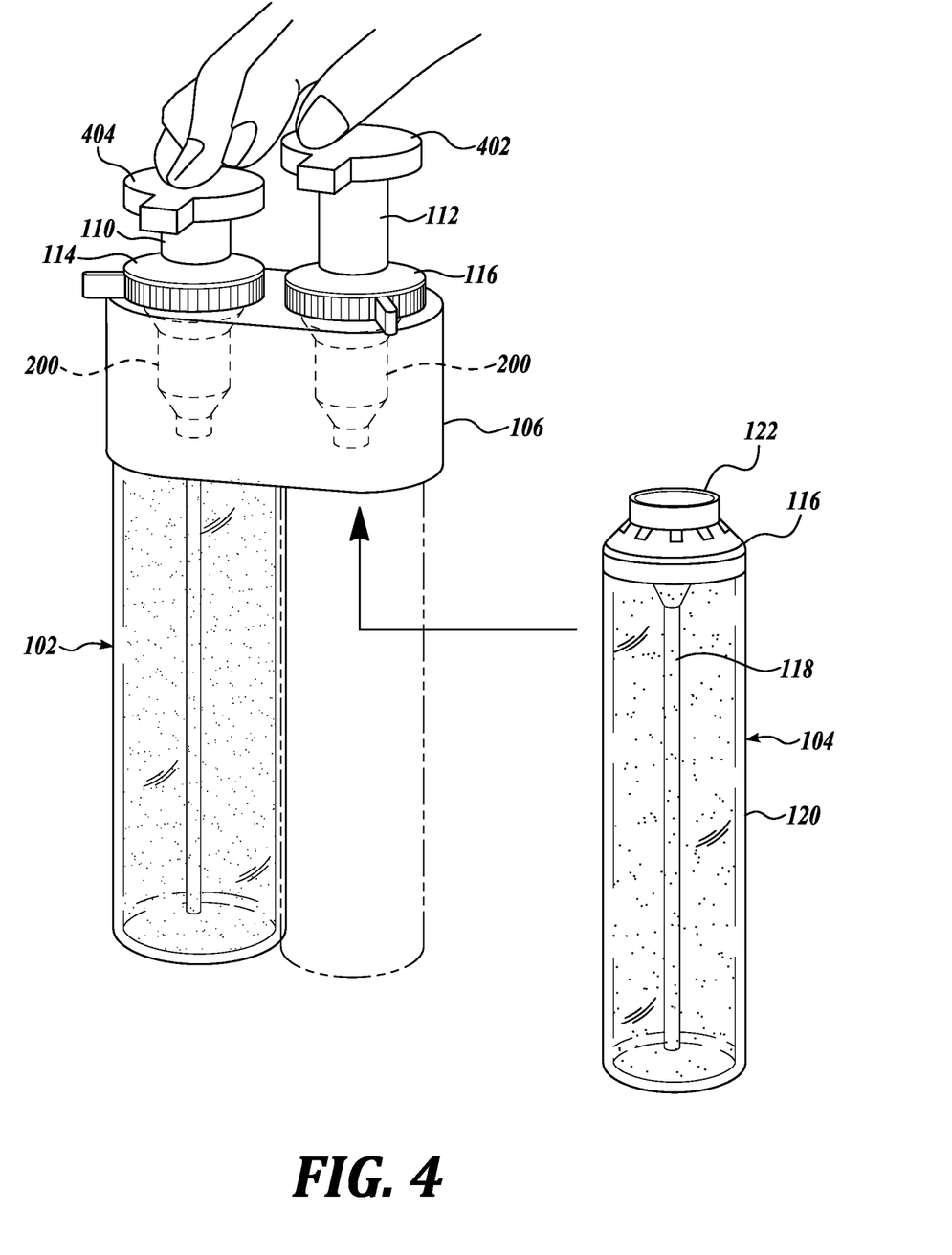
FIG. 4 is a diagrammatical illustration of a pumping assembly having adjustable volume dispensing used in the dual dispensing pack of FIG. 1, wherein separate taps are at different heights at initial piston setting.

In one embodiment of FIG. 4, the dual dispensing pump head 106 can use two separate independently depressed taps 402, 404 to dispense the fluids; however, the separate taps 402, 404 are depressed in the same manual operation. In the embodiment with two separate taps, for example, dials 114, 116 are rotated to dispense the desired ratios, and in doing so, the dials 114, 116, move the piston 112 up or down (along with the respective tap) depending on the ratio. A higher piston corresponds to a longer pump stroke, and a lower piston corresponds to a shorter pump stroke, where each piston is operated by a separate tap. Then, the higher piston would be depressed first by a first tap 402 until it reaches the height of the lower piston 404 and then, the second tap would be depressed down with the first tap until both pistons bottom out.

Figure 3:
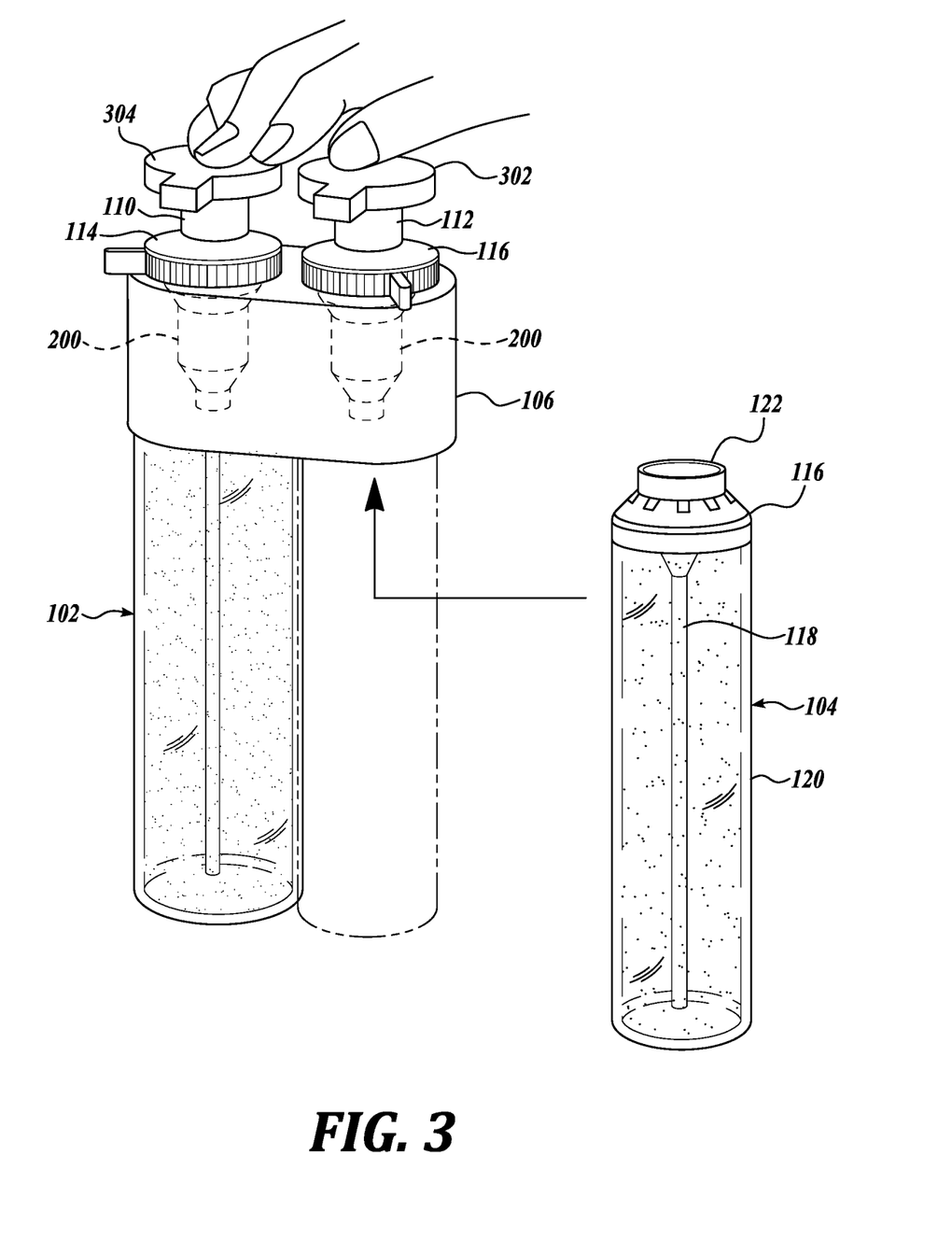
FIG. 3 is a diagrammatical illustration of a pumping assembly having adjustable volume dispensing used in the dual dispensing pack of FIG. 1, wherein separate taps are at the same height at initial piston setting.

In another embodiment of FIG. 3 with two separate taps, for example, dials 114, 116 are rotated to dispense the desired ratios, and in doing so, the vertical (up/down) travel distance of the pistons inside the pump housing is fixed and "locked-in." For example, a longer downward stroke would dispense the 80% ratio and the shorter downward stroke would dispense the 20% ratio. Then the two separate taps 302, 304 start at the same height, but, the one set with the lower ratio bottoms first, and the second tap continues to be depressed until it too bottoms out.

In one embodiment, a dual dispensing pack comprises: a dual dispensing pump head having a first pumping assembly and a second pumping assembly; the first pumping assembly operatively coupleable to a first bottle and the second pumping assembly operatively coupleable to a second bottle; the first pumping assembly including a first piston, and the second pumping assembly including a second piston; wherein a stroke length of the first piston is set different to a stroke length of the second piston; and wherein a volume dispensed by the first pump assembly is independently varied from a volume dispensed from the second pump assembly. In one embodiment, the dual dispensing pack further comprises a separate tap for each piston, wherein the separate taps are juxtaposed next to each other for depressing with a common action. In one embodiment, the separate taps are at the same height at initial piston setting. In one embodiment, the separate taps are at different heights at initial piston setting.

In one embodiment, the present disclosure provides a dual dispensing pump head 106, wherein a stroke length of the first 110 and second 112 pistons is the same, and the volume dispensed by the first and second pump assemblies 200 is independently varied by the dials 114 and 116. In one embodiment, therefore, to dispense a different amount from one or both bottles 110, 112, the dials 114 and 116 are moved clockwise or counterclockwise.

In one embodiment, the dials 114 and 116 set the height of the upper adjustable brake 220 on the piston 112 that stops the upward sliding of the annular plug 210. Therefore, if the height of the upper adjustable brake 220 is set higher, the annular plug 210 will continue sliding higher as the piston is manually-assisted down. Then, instead of flowing in the passage 222 from the chamber 202 to the hollow center 216, fluid will fill the space between the outside of the piston 112 and inner wall of the chamber 202 as the annular plug 210 instead of braking and forcing fluid into the passage 222, the annular plug 210 slides up as the piston 112 is pushed down. The amount of fluid dispensed from each pump assembly 200 can be set different and independent of the other, even when the stroke of the pump pistons 110 and 112 is the same length. The amount of fluid that is displaced can be calculated as the upper adjustable brake 220 is set higher and higher, so that the dials 114 and 116 can have numerical settings corresponding to percent of 100 percent of stroke. For example, settings can include from 0% to 100% in 1%, 5%, 10% increments. In one embodiment, for each dial 114, 116, the dials can have pre-set setting, for example, at 10%, 20%, 30% and 90%, 80%, 70% etc. In one embodiment, the dials 114, 116 are linked so that adjusting one automatically adjusts the second.

In one embodiment, the adjustment of the upper adjustable brake 220 with the dial 116 is made via a telescoping tube 226 on the exterior of the piston 112. Therefore, when the dial 116 is turned, the telescoping tube 226 turns while moving up or down on wide-spaced or narrow-space threads, and in the turning moves the annular plug 210.

In one embodiment, the dual dispensing pump head 106 can be provided separately from the bottles 102, 104. In one embodiment, the pump assembly 200 can be provided separately to make 2, 3, 4, or more multiple fluid dispensing pump heads. Then, the pistons of each pumping assembly can be rigidly connected to all other dispense to dispense multiple fluids from a common tap, wherein the volume of each fluid can be independently varied and adjusted. The present disclosure is not limited to the number of bottles used in a multiple fluid dispensing pump head.

While illustrative embodiments have been illustrated and described, it will be appreciated that various changes can be made therein without departing from the spirit and scope of the invention.

The embodiments if the invention in which an exclusive property or privilege is claimed are defined as follows:

1. A pumping assembly, comprising:
   a variable volume chamber;
   a piston that slides up and down within the variable volume chamber at the upper opening of the variable volume chamber, wherein the piston includes an annular plug that slides on the piston between a static brake and an adjustable brake on the piston, wherein the annular plug opens and closes a passage from the variable volume chamber to a hollow center of the piston.

2. The pumping assembly of claim 1, further comprising a compression spring that applies an upward force on the piston, and a ball valve that opens and closes an opening at the lower end of the variable volume chamber.

3. The pumping assembly of claim 1, further comprising a dial connected to the adjustable brake that moves the adjustable brake up or down depending on rotating the first dial clockwise or counterclockwise.

4. A method of making a multiple fluid dispensing pump head, comprising:
   assembling two or more of the pumping assemblies of claim 1 in a single multiple fluid dispensing pump head.

5. The method of claim 4, further comprising rigidly connecting the piston of each pumping assembly to a common tap.

6. A dual dispensing pack, comprising:
   a dual dispensing pump head having a first pumping assembly and a second pumping assembly, wherein the first pumping assembly has a first variable volume chamber and the second pumping assembly has a second variable volume chamber;
   the first pumping assembly operatively coupleable to a first bottle and the second pumping assembly operatively coupleable to a second bottle; and
   the first pumping assembly including a first piston, and the second pumping assembly including a second piston;
   wherein a stroke length of the first piston is the same as a stroke length of the second piston; and
   wherein the first piston includes a first annular plug that slides on the first piston between a first static brake and a first adjustable brake on the first piston, and the second piston includes a second annular plug that slides on the second piston between a second static brake and a second adjustable brake on the second piston.

7. The dual dispensing pack of claim 6, wherein the first and the second bottles are detachable from the dual dispensing pump head.

8. The dual dispensing pack of claim 6, wherein the first bottle includes a first diptube, and the second bottle includes a second diptube.

9. The dual dispensing pack of claim 6, comprising a tap rigidly connecting the first piston to the second piston.

10. The dual dispensing pack of claim 6, comprising a first dial connected to the first adjustable brake that moves the first adjustable brake up or down depending on rotating the first dial clockwise or counterclockwise, and a second dial connected to the second adjustable brake that moves the second adjustable brake up or down depending on rotating the second dial clockwise or counterclockwise.

11. The dual dispensing pack of claim 10, wherein the first dial is fitted on the outside of the first piston and the second dial is fitted on the outside of the second piston.

12. A dual dispensing pump head, comprising:
   a first pumping assembly connected to a dual dispensing tap, wherein the first pumping assembly has a first variable volume chamber;
   a second pumping assembly connected to the dual dispensing tap, wherein the second pumping assembly has a second variable volume chamber; and
   wherein the first pumping assembly includes a first piston, and the second pumping assembly includes a second piston, wherein a stroke length of the first and second piston is the same, wherein the first piston includes a first annular plug that slides on the first piston between a first static brake and a first adjustable brake on the first piston, and the second piston includes a second annular plug that slides on the second piston between a second static brake and a second adjustable brake on the second piston.

13. The dual dispensing pack of claim 12, wherein the tap rigidly connects the first piston to the second piston.

14. The dual dispensing pack of claim 12, comprising a first dial connected to the first adjustable brake that moves the first adjustable brake up or down depending on rotating the first dial clockwise or counterclockwise, and a second dial connected to the second adjustable brake that moves the second adjustable brake up or down depending on rotating the second dial clockwise or counterclockwise.

15. The dual dispensing pack of claim 14, wherein the first dial is fitted on the outside of the first piston and the second dial is fitted on the outside of the second piston.

16. A dual dispensing pack, comprising:
   a dual dispensing pump head having a first pumping assembly and a second pumping assembly, wherein the first pumping assembly has a first variable volume chamber and the second pumping assembly has a second variable volume chamber;
   the first pumping assembly operatively coupleable to a first bottle and the second pumping assembly operatively coupleable to a second bottle; and
   the first pumping assembly including a first piston, and the second pumping assembly including a second piston;
   wherein a stroke length of the first piston is independently adjustable, and a stroke length of the second piston is independently adjustable; and
   wherein the first piston includes a first annular plug that slides on the first piston between a first static brake and a first adjustable brake on the first piston, and the second piston includes a second annular plug that slides on the second piston between a second static brake and a second adjustable brake on the second piston.

17. The dual dispensing pack of claim 16, further comprising a separate tap for each piston, wherein the separate taps are juxtaposed next to each other for depressing with a common action.

18. The dual dispensing pack of claim 17, wherein the separate taps are at the same height at initial piston setting.

19. The dual dispensing pack of claim 17, wherein the separate taps are at different heights at initial piston setting.

* * * * *